Nov. 27, 1923.　　　　　　　1,475,326
A. J. STEPHENS
INNER TIRE
Filed May 27, 1920
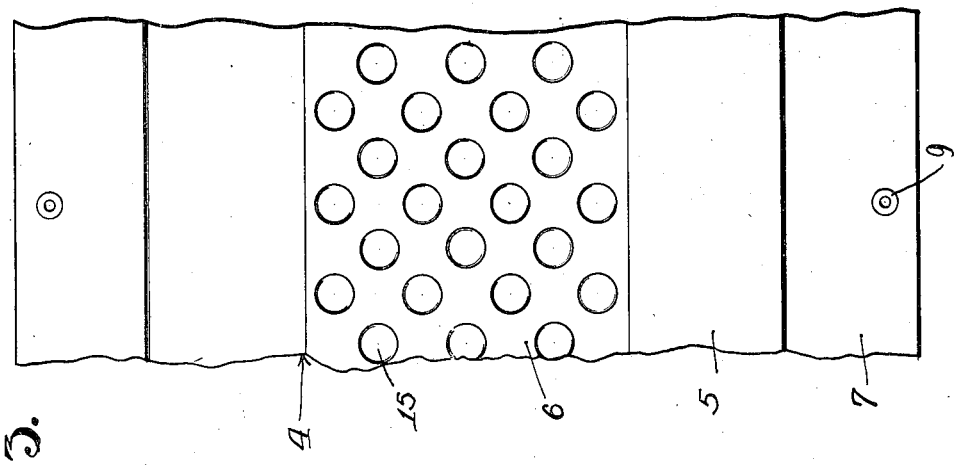
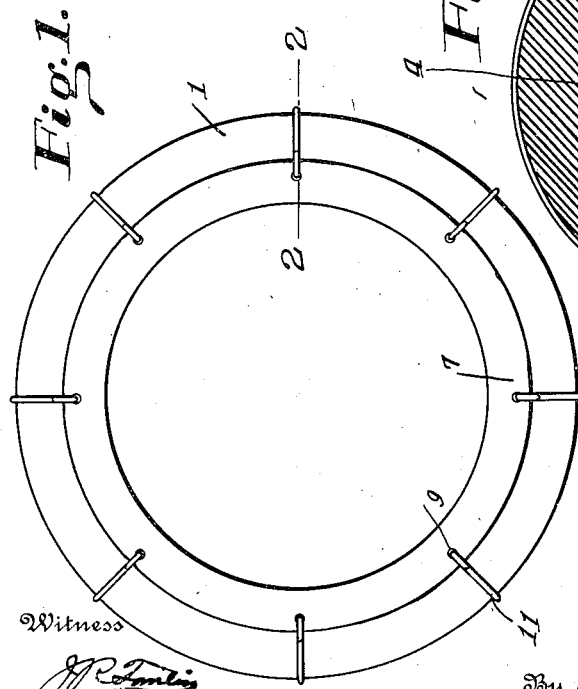
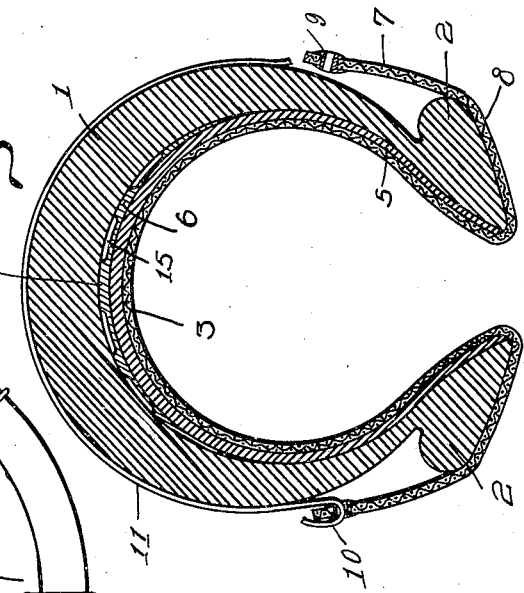
Inventor
A. J. Stephens.
By C. A. Snow & Co.
Attorneys Patented Nov. 27, 1923.

1,475,326

UNITED STATES PATENT OFFICE.

ANDREW J. STEPHENS, OF KANSAS CITY, MISSOURI.

INNER TIRE.

Application filed May 27, 1920. Serial No. 384,678.

*To all whom it may concern:*

Be it known that I, ANDREW J. STEPHENS, a citizen of the United States, residing at Kansas City, in the county of Jackson and State of Missouri, have invented a new and useful Inner Tire, of which the following is a specification.

It is the object of this invention to provide a novel liner adapted to be placed on a tire casing, to lessen the liability of puncture and to reinforce the casing.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a tire casing whereunto the device forming the subject matter of this application has been applied; Figure 2 is a section taken on the line 2—2 of Figure 1; and Figure 3 is a fragmental plan showing the liner laid flat.

The numeral 1 denotes a tire casing of any desired form the same being provided, if desired with clincher beads. Within the casing is disposed the liner or inner tire, so called, forming the subject matter of this application. The liner comprises a body 3 which, if desired, may be made of canvas. On the liner 3 is superposed a tread 4, the tread 4 being made of cushion stock and including an inner member 5 and an outer member 6. The outer member 6 is somewhat narrower than the inner member 5, the body 3 being wider than the member 5, so as to form flaps 7, adapted to be folded across the beads 2 as indicated at 8. The flaps 7 are provided adjacent to their edges with eyelets 9 adapted to receive hooks 10 on flexible elements 11, which may be pieces of wire, the flexible elements extending across the tread portion of the casing 1. The liner is of endless annular form and, thus, is to be distinguished from blowout patches and the like, which, ordinarily, are not more than from six to ten inches long. The liner is trough-shaped in cross section and fits snugly within the casing 1. The detachable fastenings 11 are used temporarily, to hold the liner in place until the casing and the liner, with the inner tube (not shown) have been mounted on the wheel rim. After the parts have been mounted on the rim as above alluded to, the members 10, generally, are removed. Owing to the fact that the members 5 and 6 are made of cushion stock, there is no overheating, due to the friction of canvas on canvas. If desired, the part 6 of the tread may be supplied with recesses 15, constituting vacuum cups, which, cooperating with the casing 1 serve to prevent relative circumferential creeping and relative transverse movement between the liner and the casing. A casing reinforced by a device constructed in accordance with this invention will be effective to resist puncture to a marked degree. It will be understood, of course, that the body 3 and the parts 5 and 6 of the tread 4 are cemented together, vulcanized or otherwise united according to any of the known methods of the tire builders' art.

Having thus described the invention, what is claimed is:—

A liner for tire casings, comprising an endless annular member which is U-shaped in cross section, said member comprising a textile body and a cushion stock tread, the body being extended beyond both edges of the tread to form flaps which are foldable across the edges of a tire casing, the tread being made up of inner and outer members, the inner member being wider than the outer member and extending substantially to the lines where the body is folded to form the flaps, the outer member being provided on its outer surface with recesses, the recesses extending but part way through the outer member to form vacuum cups adapted to engage the inner surface of a tire casing and hermetically sealed at their inner ends, the inner member forming a resilient backing for the thinned portions of the outer member which lie at the inner ends of the recesses.

In testimony that I claim the foregoing as my own, I have hereto affixed my signature in the presence of two witnesses.

ANDREW J. STEPHENS.

Witnesses:
N. E. TREGO,
J. E. FLEMING.